US006968104B2

(12) United States Patent
Zheng et al.

(10) Patent No.: US 6,968,104 B2
(45) Date of Patent: Nov. 22, 2005

(54) VARIABLE BENDING RADIUS H-TREE DISTRIBUTION DEVICE

(75) Inventors: Jun-Fei Zheng, Palo Alto, CA (US); Ian Young, Portland, OR (US); Dongwhan Ahn, Dorchester, MA (US)

(73) Assignees: Intel Corporation, Santa Clara, CA (US); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/364,611

(22) Filed: Feb. 10, 2003

(65) Prior Publication Data

US 2004/0156634 A1     Aug. 12, 2004

(51) Int. Cl.[7] .............................. G02B 6/12; G02B 6/26
(52) U.S. Cl. ........................... 385/45; 385/14; 385/15; 385/48
(58) Field of Search .......................... 385/15, 123, 45, 385/14, 27, 42, 44–48, 50

(56) References Cited

U.S. PATENT DOCUMENTS 5,416,861 A *   5/1995   Koh et al. ..................... 385/14
6,351,576 B1     2/2002   Ding

OTHER PUBLICATIONS

Mule, Schultz, Gaylord, and Meindl, "An Optical Clock Distribution Network for Gigascale Integration," IEEE Interconnect Technology Converence (2000).*
Gan, Wu, Luan, Bihari, Chen, "Integration of 45-degree Micro-couplers in Guided-wave Optical Clock Distribution System for Supercomputer," 1998 International Symposium on Microelectronics.*
Wu, Bihari, Gan, and Chen, "Board-level Optical Clock Signal Distribution Using Si C-MOS Compatible Polymide-based 1-to-48 Fanout H-tree," SPIE vol. 3551 1998.*
Horst, Beyler, Bona, Fluck, Germann, Offrein, Salemink, and Wiesmann, "Compact, Tunable, Optical Devices in Silicon-Oxynitride Waveguide Technology," 1999 Optical Society of America.*
Chen, "Fully embedded Guided-wave Optical Interconnects with Full Packaging Compatibility with Microelectronics" [online] (projected publication Jan., 2003).
Koh, "OptoElectronic Multichip Modules Using MEMS Fabrication Techniques," 61-62 (1998).
Koh, "Optoelectronic multichip modules for high-speed computer systems and communication networks," Optical Engineering 36(5):1319-1325 (1997).
Koh, "Synchronous global clock distribution on multichip modules using optical waveguides," Optical Engineering 33(5):1587-1595 (1994).

(Continued)

*Primary Examiner*—John D. Lee
*Assistant Examiner*—James D. Stein
(74) *Attorney, Agent, or Firm*—Marshall, Gerstein & Borun LLP

(57) ABSTRACT

An optical network, in the form of a $1\times 2^N$ splitter, includes a series of interconnected distribution devices of varying size. Each distribution device may be an H-tree distribution device having an input waveguide and four output waveguides that provide in-phase, equal intensity copies of a signal received on the input waveguide. The network may include a primary H-tree distribution device and a plurality of secondary H-tree distribution devices each of a smaller size than the primary H-tree distribution device. Individual H-tree distribution devices may have a first stage Y-branch and a second stage Y-branch each of different radii of curvature. Further still, progressively smaller radius of curvature Y-branches may be used to form the $1\times 2^N$ splitter, where N may be an even or odd integer.

34 Claims, 6 Drawing Sheets

OTHER PUBLICATIONS

Mehrotra, et al., "Technology Scaling Impact of Variation on Clock Skew and Interconnect Delay," International Interconnect Technology Conference (Jun. 5, 2001).

Mule, et al., "Input Coupling and Guided-wave Distribution Schemes for Board-level Intra-chip Guided-wave Optical Clock Distribution Network Using Volume Grating Coupler Technology," (Jun. 5, 2001).

Mule, et al., "An optical clock distribution network for gigascale integration," Interconnect Technology Conference IEEE (2000).

Wu, et al., "Guided-wave optical clock signal distribution system" [online] (projected first publication Jan. 10, 1998).

* cited by examiner

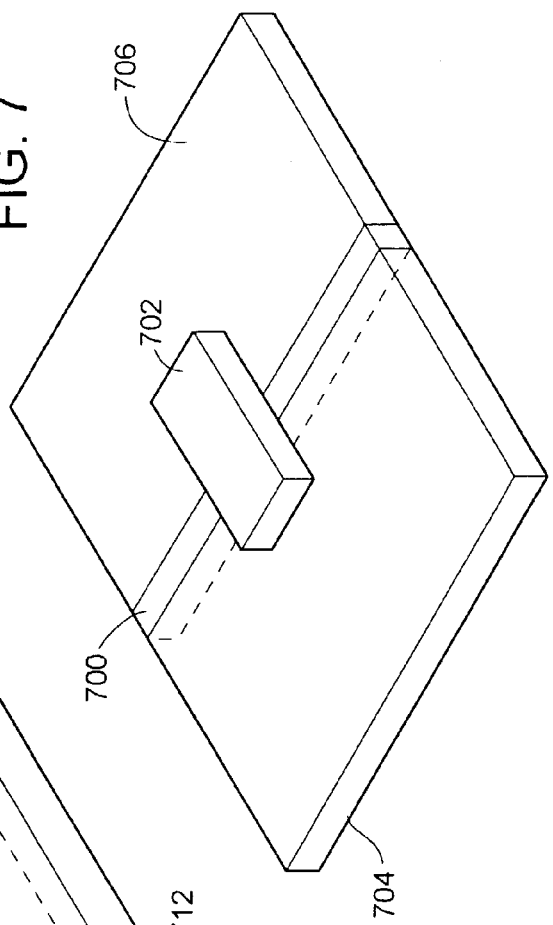
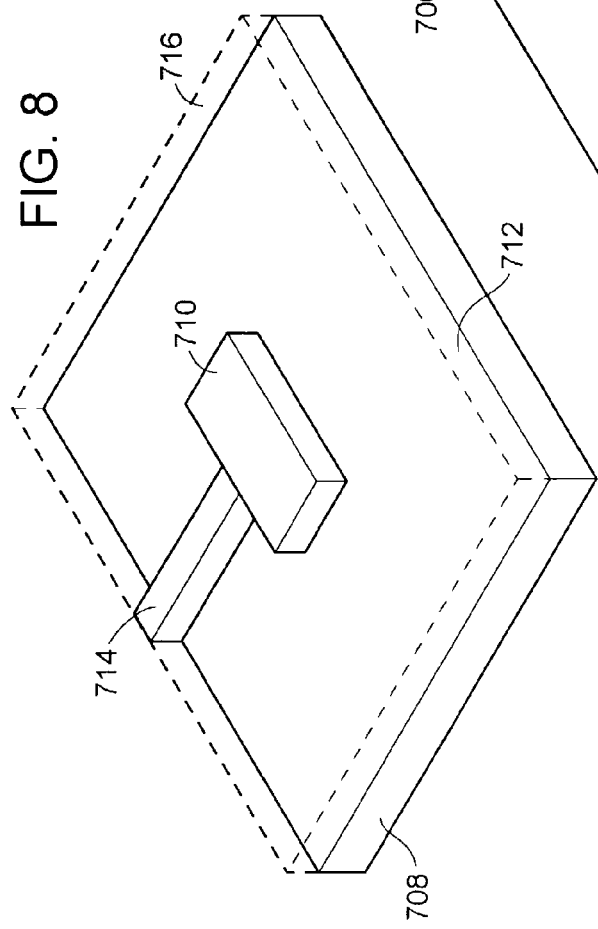

VARIABLE BENDING RADIUS H-TREE DISTRIBUTION DEVICE

FIELD OF THE DISCLOSURE

This patent generally relates to signal propagation and, more specifically, to optical network distribution of a signal.

BACKGROUND OF THE PRIOR ART

For digital systems, accurate timing is crucial to data transmission. Clock signals set the timing for the components in a digital system and therefore are crucial to proper operation. A computer motherboard, for example, will transmit a master clock signal to integrated circuit boards, chipsets, peripherals, microprocessors, or other components connected to the motherboard. In this way, system components may be synchronized together using a shared clock signal.

Various techniques exist for generating and distributing clock signals within a digital system. For example, a primary clock signal might be generated by a ring oscillator or separate clock chip using a crystal oscillator and then routed from the generator to the devices connected to the clock. These techniques involve electrical clock signals, i.e., clock signals traveling along metallic or semiconductor conduits. Unfortunately, electrical clock signals present numerous design limitations.

Ideally, clock signals would have a well defined duration, consistent shape, and zero propagation path dependence. In reality, electrical clock signals have variable rise and fall times, noticeable jitter and a path-dependent skew that arises from timing differences and waveform variations between clock signals. Electrical clock signals also have limited bandwidth.

Typically, clock signals are distributed throughout a system via a distribution network. In theory, the network would make duplicate copies of a clock signal and provide identical paths for each duplicate copy. In reality, however, skew problems abound, primarily due to electrical load differences among the various paths and parasitic effects within the network.

Recently, some have proposed moving away from a purely electrical digital clocking system to an optical clocking system. Using optical signals, i.e., light pulses, presents some obvious theoretical advantages. Optical signals are not susceptible to load variations or parasitic effects because they travel through waveguides and not conducting metallic wires. Also, optical signals may transmit at much faster clock rates, allowing for THz range clock cycles, while electrical clock signals have a theoretical limit of about 25 GHz for 5 mm transmission distances. Thus, optical clock signals can provide orders of magnitude faster performance capabilities.

In the optical networks proposed for clock signal distribution, a network distributor generates or receives a clock signal, and that signal is then split into multiple signals by either a simple Y branch splitter or a multimode interferometer. Each copy of the clock signal is then provided to an output waveguide. In some devices, an optical H-tree structure has been proposed. An optical H-tree has three Y branches that form an H-shaped layout with an input at the center of the H-tree structure.

While optical networks do not have the impedance load variation and parasitic problems of electrical domain networks, they have their share of shortcomings. One of the main problems affecting optical networks is modal confinement. To maintain its waveform and intensity, a signal's mode must be confined to the propagating waveguide. This means that only straight waveguides or waveguides of certain, typically large, bending radii have been proposed. The bending radii are determined by the index contrast of the waveguide core and its cladding layer. A large bending radius is used to avoid signal loss. Unfortunately, these limitations result in large devices of limited scalability. The problem is multiplied with network complexity.

BRIEF DESCRIPTION OF THE DRAWINGS

FIG. 7 is a perspective view of an example coupling between a waveguide of an H-tree device and an optical-to-electrical converter.

FIG. 8 is a perspective view of another example coupling between a waveguide of an H-tree device and an optical-to-electrical converter.

DETAILED DESCRIPTION

Various optical devices are described. Although the descriptions are generally provided in the context of propagating an optical clock signal, it will be understood by persons of ordinary skill in the art that the examples are not limited to the transmission of optical clock signals. The devices described may be used to distribute any information carrying optical signal. Furthermore, while the techniques described are provided in the context of distributing an input optical signal into a plurality of output signals, the techniques may be used on any number of optical devices to provide increased scalability and performance.

Figure 1:
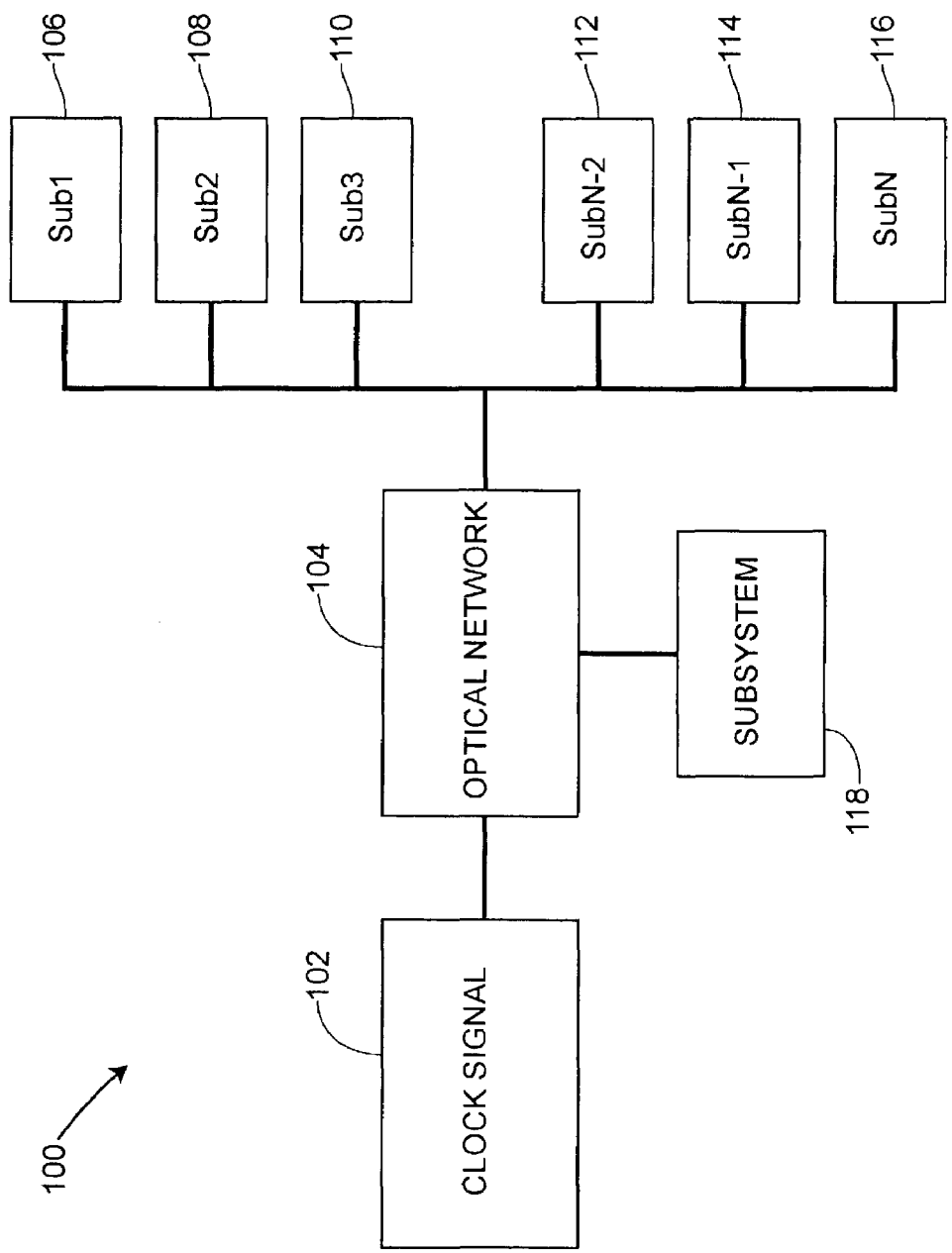
FIG. 1 illustrates a system that includes an optical network routing an optical signal to a plurality of subsystems.

FIG. 1 illustrates a system 100 that provides a clock signal, or other optical signal, to devices within the system 100 or devices connected thereto. By providing identical copies of the clock signal, these devices may be synchronized together.

The system 100 includes a clock signal generator 102 coupled to an optical network 104. The clock signal generator may be a 10 GHz mode-locked laser providing an optical clock signal, such lasers are known and may have better than 100 fs jitter. An optical fiber or waveguide may be used in coupling the generator 102 to the network 104. Other optical clock signal generators may also be used. The generator 102 may alternatively provide an electrical clock signal that may be coupled to either the network 104 directly or a separate device, where the electrical clock signal is converted to an optical clock signal. For example, an electrical clock signal may be used to modulate a laser to create an optical clock signal. The clock signal generator 102 and the optical network 104 may be integrated in a computer motherboard or on a microchip, or they may be separate devices.

The network 104 is coupled to a series of subsystems Sub1 106, Sub2 108, Sub3 110 . . . , SubN-2 112, SubN-1, 114, and SubN 116, providing an optical clock signal to each. The subsystems 106–116 may represent a circuit, microprocessor, chipset, memory, I/O interface, or other device that typically receives a clock signal in a processor system. The generator 102 provides a clock signal to the network 104, which then creates identical copies of the clock signal. The copies are synchronized with the clock signal from the generator 102 and are substantially identical in intensity and are in-phase. The network 104 provides at least one copy to each of the subsystems 106–116. The network 104 is also connected to a separate subsystem 118 that may receive a different clock signal from that sent to the subsystems 106–116.

Figures 2, 3:
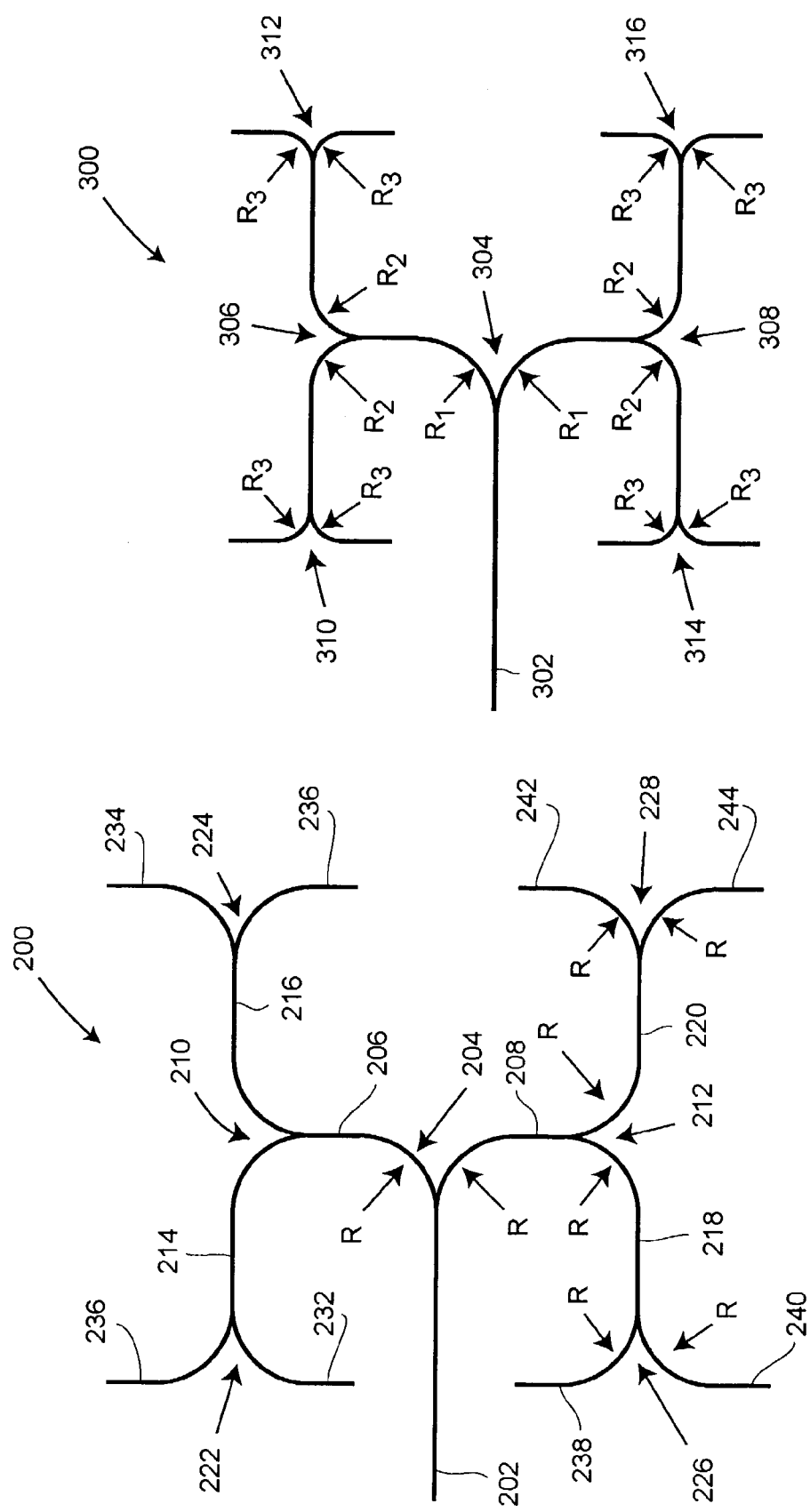
FIG. 2 illustrates a prior art H-tree distribution device formed with a constant radius of curvature, in accordance with an example of the present teachings.
FIG. 3 illustrates another example H-tree distribution device formed with varying radii of curvature, in accordance with an example of the present teachings.

The network 104 may be a network of individual H-tree distribution devices like those shown in FIGS. 2 and 3. FIG. 2 illustrates a waveguide pattern of a prior art H-tree distribution device 200. The H-tree distribution device 200 receives an input signal and operates as a 1×2×2×2 optical splitter, forming eight like, copies of that input signal.

The device 200 includes an input waveguide 202 adapted to receive an input signal and coupled to a first Y-branch 204 having branching waveguides 206 and 208. The branching waveguides 206 and 208 have an identical radius of curvature, R, and are coupled to Y-branches 210 and 212, respectively. The Y-branch 210 has branching waveguides 214 and 216, each with radius of curvature, R, and the Y-branch 212 has branching waveguides 218 and 220, each with radius of curvature, R. In other words, the Y-branches 204, 210, and 212 are formed with the same radius of curvature, R. Y-branches 222, 224, 226, and 228 also each have a radius of curvature, R, and are coupled to waveguides 214, 216, 218, and 220, respectively. With the Y-branches 204, 210, 212, and 222–228 being 50/50 splitters, the input signal received on the waveguide 202 is split into 8 identical copies propagating along output waveguides 230, 232, 234, 236, 238, 240, 242, and 244, as shown. The device 200 is limited in scalability because of the use of Y-branches of the same size.

FIG. 3 illustrates an H-tree distribution device 300 in accordance with a present example. The device 300 has an input waveguide 302 connected to a first Y-branch 304 having a radius of curvature, R1. Two additional Y-branches 306 and 308 are connected to the Y-branch 304. In this configuration, the first Y-branch 304 is an input Y-branch that creates two output signals and couples one into the Y-branch 306 and the other into the Y-branch 308. The Y-branches 306 and 308 are formed of waveguides having a radius of curvature, R2, where R2 is less than R1. The Y-branch 306 is coupled to two additional Y-branches 310 and 312, each being formed with a radius of curvature, R3, where R3 is less than R2. The Y-branch 308 is also coupled to two additional Y-branches 314 and 316, each being formed with the radius of curvature, R3, as well. By using Y-branches of different radius of curvature, the device 300 is smaller in overall area than the device 200.

While the illustrated example of FIG. 3 shows R1>R2>R3, or each Y-branch having a progressively smaller radius of curvature, this relationship is by way of example only. Some of the radii of curvature may be equal to one another, for example, R2 may equal R3, if necessary. By having at least one of the radii of curvature smaller than the others, the device 300 may be scaled down in comparison. Also, by using a larger bending radius on the first Y-branch 304, the overall splitter loss is reduced. With larger radii, splitters are easier to fabricate and, thus, have better performance. Also, at an input stage, such as waveguide 302, optical intensity is strongest. Thus, loss at the input level would have substantially more of an impact on device performance than loss at subsequent, lower-signal-intensity stages.

The device 300 may have a silicon or $SiO_2$ material as the substrate. A material like a $SiO_xN_y$ material (with x between and including 0 to 2 and y between and including 0 to 1.333) may form the waveguides and the cladding may be $SiO_2$. These x and y values are provided by example and apply to all $SiO_xN_y$ materials herein. Other suitable materials will be known to persons of ordinary skill in the art. The device 300 may be fabricated using known $SiO_2$ and $SiO_xN_y$ deposition, patterning, and etching techniques. For example, a $SiO_2$ substrate may be formed with a $SiO_xN_y$ substrate layer deposited on it. The device shape may then be patterned and etched in the $SiO_xN_y$ layer, before another deposition step provides a cladding layer for the structure. Numerous masking techniques are known for forming Y-branches with little split loss. Although other materials may be used, the refractive index of $SiO_xN_y$ is adjustable over a wide range, which allows for flexibility in device design. Further, using a $Si/SiO_2$-based waveguide material also allows the device 300 to be integrated with existing Si CMOS integrated circuit fabrication techniques. This may be useful to integrate a photodetector and control circuitry with the device. Polyimides are another class of materials that may be used to form the device 300.

In general, the material chosen for the device 300 has an index of refraction differential (or contrast), between a waveguide region and a cladding region (not shown), that is sufficient to prevent appreciable bending loss at curved portions. Persons or ordinary skill in the art will know how to calculate suitable ranges of index of refraction differential for given radii of curvature. The smaller the differential the larger the bending radius used. By way of example, between 25 μm and 800 μm radii may be used on the Y-branches with an appropriate index of refraction differential to prevent or reduce losses. Smaller radii of curvature may also be used.

Figure 4:
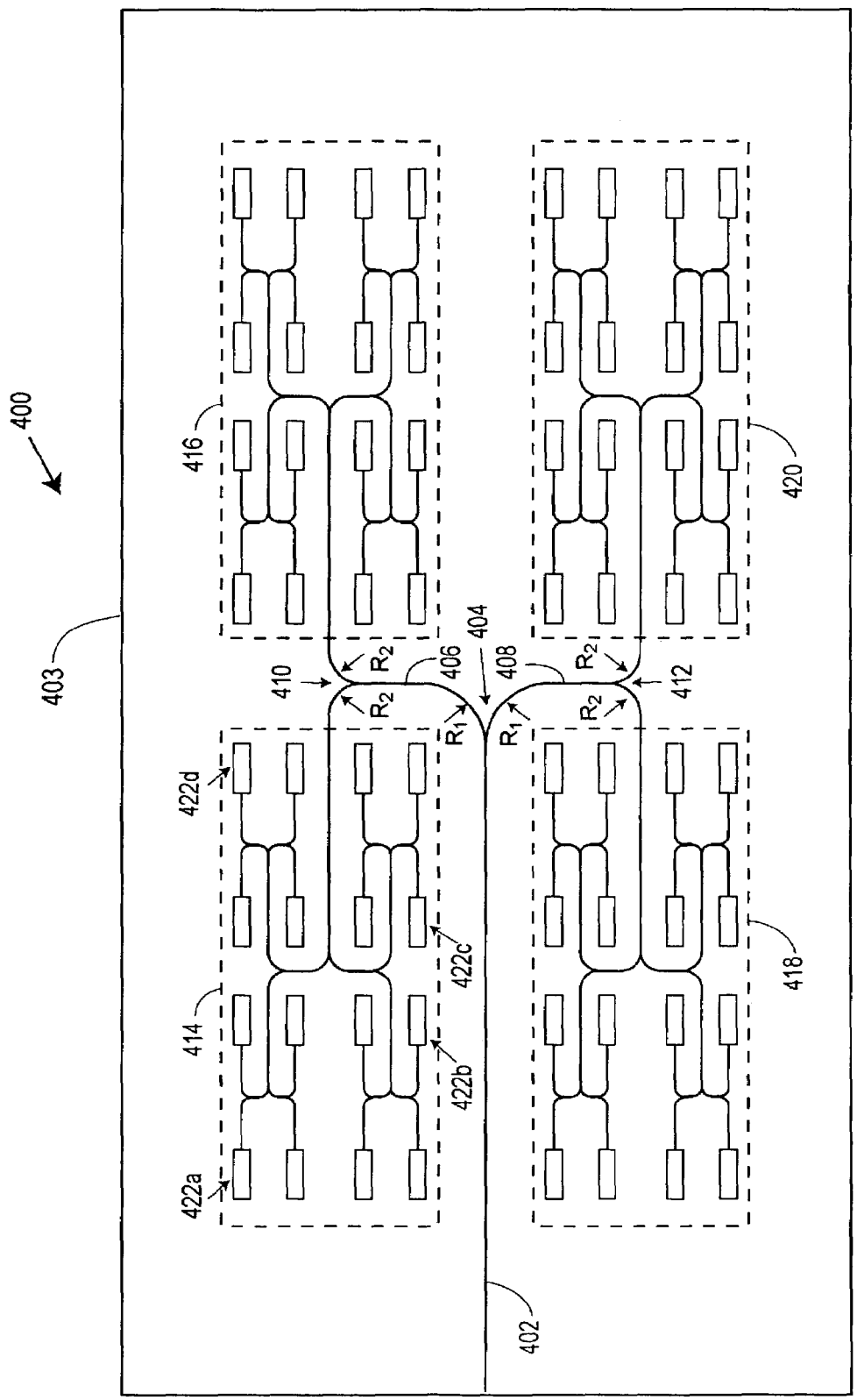
FIG. 4 is a top view of an optical network formed from four identical, individual H-tree distribution networks, each network having four optical-to-electrical converters.

FIG. 4 illustrates an example optical network 400, which may be used as the network 104 and includes a network of interconnected H-tree distribution devices, like devices 200 and 300. The network 400 has a single input waveguide 402 through which an input optical signal is provided. An optical fiber coupled to a side of the network 400 may provide the optical signal or the network may be formed integrated to a planar waveguide or optical interconnect layer. The network 400 may receive different input signals through a common input waveguide. The waveguide 402 is formed in a substrate 403 and coupled to a first Y-branch 404, which is a primary Y-branch that initially splits an input optical signal into two optical signals of equal intensity. The primary Y-branch 404 has two branching waveguides 406 and 408, both with radius of curvature, R1, that are connected to two secondary Y-branches 410 and 412, respectively, both formed with a radius of curvature, R2. Radius of curvature, R2, is less than the radius of curvature, R1, in the illustrated example of FIG. 4. The substrate 403 may be a silicon or polysilicon material.

The optical network 400 has four, substantially identical H-tree distribution networks 414, 416, 418, and 420 symmetrically coupled about the Y-branch 404. Each network 414–420 receives an input signal, in optical form, and produces four in-phase, equal intensity copies of that signal that are converted to an electrical signal. The networks 414–420 may be other optical networks or splitters, as well, such as a MMI-splitter or Y-branch splitter, the latter forming a device similar to device 300. Also, although each of the networks 414–420, in the illustrated example, all are substantially identical, they may alternatively be different in shape.

The Y-branch 410 is coupled to the H-tree distribution networks 414 and 416, and Y-branch 412 is coupled to the H-tree distribution networks 418 and 420. The network 414 has four optical-to-electrical (O/E) converter arrays 422a, 422b, 422c, and 422d, each having four O/E converters, also termed photodetectors (of which a photodiode is an example), to convert an optical signal into an electrical form. Similarly, networks 416–420 have converter arrays 424 (a–d), 426(a–d), and 428(a–d), respectively. The arrays 422, 424, 426, and 428 may be formed of fast photodetectors directly coupled or evanescently coupled to optical waveguides within the network 400.

The network 400 is shown as a 1 to 64 optical network, i.e., a network having 1 input waveguide and, in this case, 64 dedicated output waveguides, each corresponding to one of the converter arrays 422–428. The network 400 may be a 1 to 128 or 1 to 256 network with the addition of additional H-tree distribution devices and additional converter arrays. Thus, the network 400 may be formed larger or smaller by using additional or fewer H-tree distribution devices within each of the networks 414–420, for example. The network 400 is a $1 \times 2^N$ network, where N indicates the size of the network.

The network 400 may be integrated with other devices like optical amplifiers, lasers, and splitters having shapes other than the H-tree distribution splitter. Using a SiON/SiO$_2$ waveguide/cladding structure for example allows the integration of the network 400 with optical and electrical devices that are amenable to Si and Si CMOS fabrication techniques.

Figure 5:
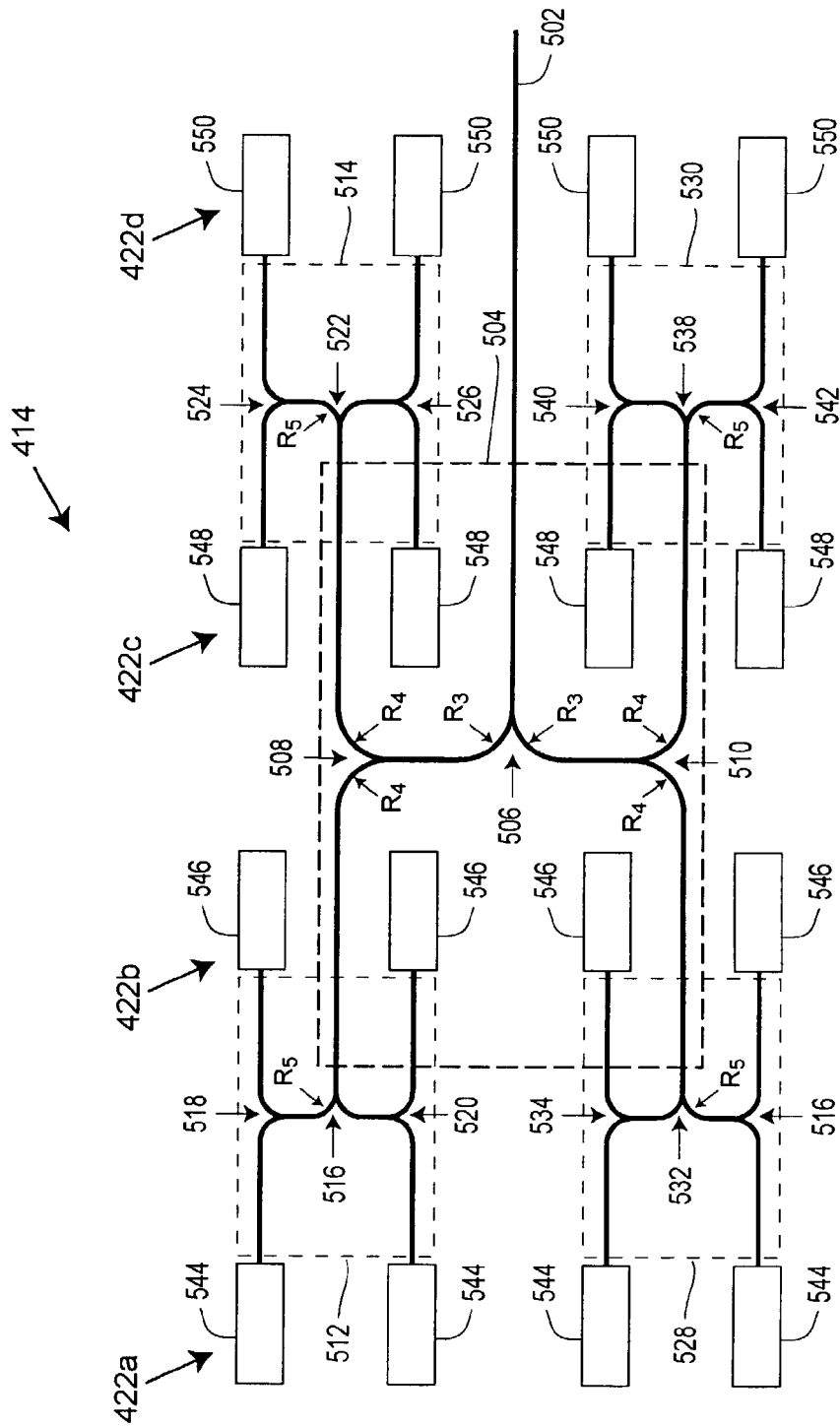
FIG. 5 is an expanded view of one of the H-tree distribution networks of FIG. 4.

FIG. 5 illustrates the network 414, although the illustration may alternatively represent that of networks 416, 418, or 420. The network 414 is a 1 to 16 network device formed of a plurality of interconnected Y-branches, which form a series of H-tree distribution devices. For example, waveguide 502 provides an input signal to an H-tree distribution device 504 that includes Y-branches 506, 508 and 510. The Y-branch 508 is coupled to two additional H-tree distribution devices 512 and 514. The H-tree distribution device 512 includes three Y-branches, 516, 518, and. 520, and the H-tree distribution device 514 includes three Y-branches 522, 524, and 526. The H-tree distribution devices 512 and 514 are smaller in size than the H-tree distribution device 504, as illustrated by the boxes 512 and 514, which are shown for explanation purposes only.

Two H-tree distribution devices 528 and 530 are coupled to the Y-branch 510, symmetric to devices 512 and 514, as shown in FIG. 5. The device 528 includes Y-branches 532, 534, and 536, and the device 530 includes Y-branches 538, 540, and 542. The device 504 receives an input signal and provides four output signals, one to each of the devices 512, 514, 528, and 530.

Each of the H-tree distribution devices 512, 514, 528, and 530 are substantially identical in size, e.g., each are formed of Y-branches having an identical radius of curvature, R5. Each is symmetrically coupled to the device 504. The H-tree distribution devices 512, 514, 528, and 530 are, therefore, secondary devices that are each smaller than the primary H-tree distribution device 504, which is formed of Y-branches 505, 508, and 510 having a radius of curvature, R3 or R4, both of which are greater than R5. While the Y-branches included in the various H-tree distribution devices 504, 512, 514, 528 and 530 are described as having the same radius of curvature (e.g., R3, R4 or R5), as with device 300, the three Y-branches within each device 504, 512, 514, 528 and 530 may have different radii of curvature.

The H-tree distribution device 512 is coupled to the O/E converter arrays 422a–422d, as shown. These arrays 422a–422d include individual O/E converters 544, 546, 548, and 550, respectively. These O/E converters 544–550 may be fast time response photodetectors that convert optical signals received from the network 414 into an electrical signal. The electrical signals may then be provided to devices like the subsystems 106–116 of FIG. 1. The O/E converters 544–550 may be coupled to the network 414 though direct coupling or evanescent coupling. Although not shown, it will be understood by persons of ordinary skill in the art that fewer O/E converters may be used. Additional, even smaller H-tree distribution devices may be used in place of the O/E converters to further increase the number of output waveguides of the network 414, i.e., the N value.

Figure 6:
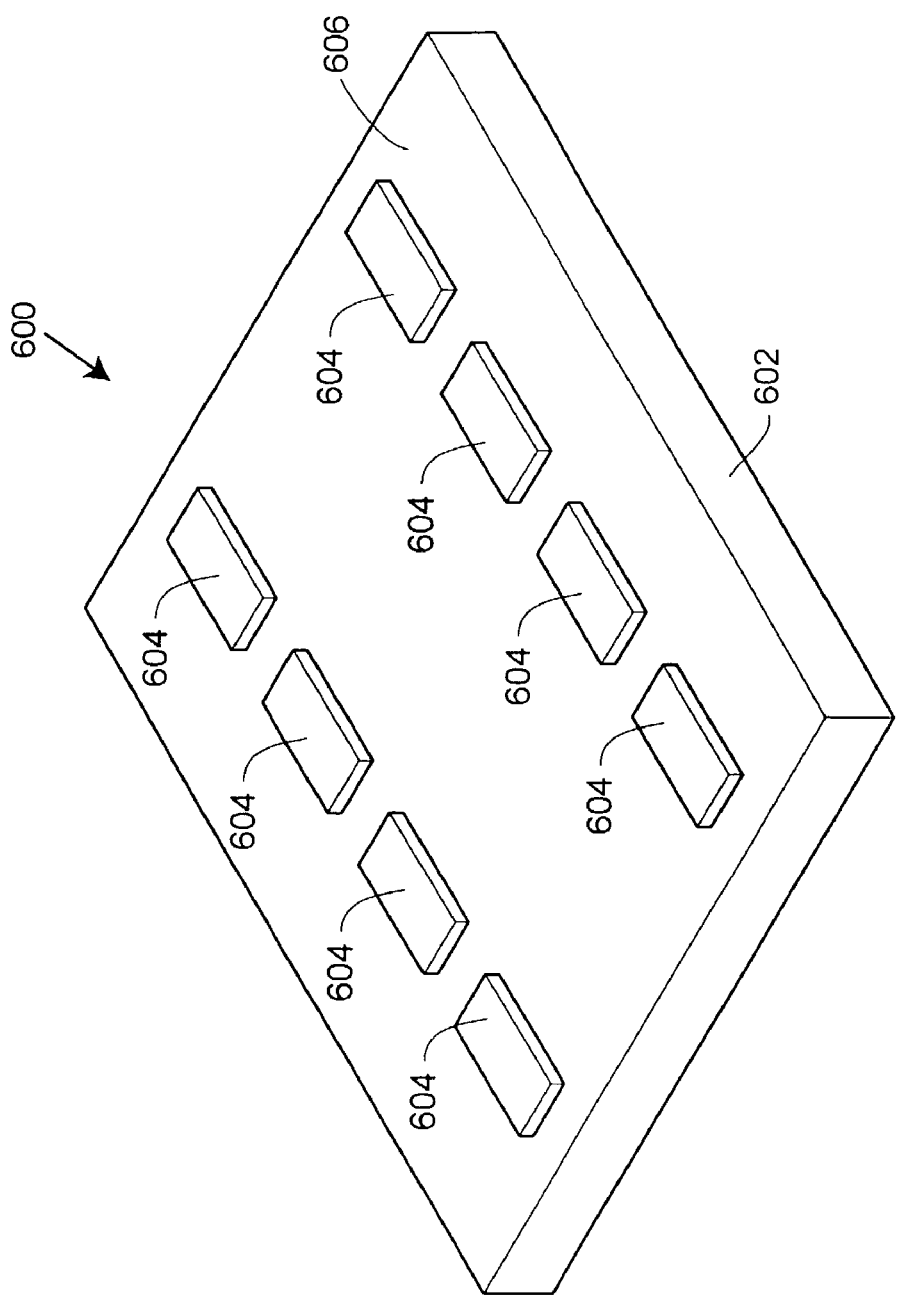
FIG. 6 is a perspective view of a substrate that may include an H-tree distribution network and shows a plurality of optical-to-electrical converters on the substrate.

FIG. 6 illustrates an example device 600 having a substrate 602 within which an H-tree distribution device or network like those of FIGS. 2–5 may be formed. A plurality of O/E converters 604 are formed on a surface 606 of the substrate. The O/E converters 604 may be connected to devices through a conductive element, like a wire-bond, a DIP package, or ball grid array. In the device 600, each of the O/E converters 604 are substantially identical.

The O/E converters 604 may be formed through known photolithographic or other etching techniques. For example, a fabrication technique includes depositing a silicon or other semiconductor layer on the substrate 602, within which a network device has been formed, and selectively etching the layer to form a desired converter pattern. It will be understood by persons of ordinary skill in the art that the O/E converters 604 are multi-layered structures, such as PN or PIN photodiodes. Si and Ge are examples of known photodetector materials that may be used to form the O/E converters 604. Although not shown, it will be understood by persons of ordinary skill in the art that an additional planarization step may be performed on the device 600.

FIGS. 7 and 8 show example couplings to an O/E converter that may be used in an H-tree distribution device. For example, FIGS. 7 and 8 show waveguides which may be considered as output waveguides of the devices 300 and 400. FIG. 7 illustrates a technique for conversation of an optical signal into an electrical signal. In the illustration, an output waveguide 700, for example, part of an H-tree distribution device, is evanescently coupled to an O/E converter 702. The waveguide 700 is formed in a substrate 704 and the O/E converter 702 is formed on a surface 706 thereof. The output waveguide 700 extends below the O/E converter 702 evanescently coupling a portion of its optical energy into the O/E converter 702, which then converts the absorbed optical energy into an electrical signal that may be communicated to downstream circuitry.

FIG. 8 shows a substrate 708 having an O/E converter 710 that extends, at least partially above a surface 712. A waveguide 714, for example, a waveguide of an H-tree distribution device, is butt-coupled to the O/E converter 710, such that an optical signal propagating along the output waveguide 714 is converted into an electrical signal in the O/E converter 702. An index matching fluid may be used between the butt-coupled surfaces of the waveguide 714 and the converter 710. Additionally, the faces of the waveguide 714 and the converter 710 may be angled to reduce any insertion loss. A planarization layer 716 is deposited on the substrate 708. The layer 716, however, is optional.

In reference to FIGS. 7 and 8, the substrate layers 704 and 708, as well as the planarization layer 716, or any other cladding layer, may be a $SiO_xN_y$ material, like $SiO_2$. The waveguides 700 and 714 may be formed of a $SiO_xN_y$ material, like SiON. Other semiconductor materials and optical waveguide materials will be known to persons of ordinary skill in the art.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalence.

What we claim is:

1. An optical network comprising:
   a substrate;
   a primary H-tree distribution device disposed in the substrate and adapted to receive an optical signal, the primary H-tree distribution device including at least one primary Y-branch having a first radius of curvature; and
   at least one secondary H-tree distribution device disposed in the substrate and coupled to the primary H-tree distribution device, the at least one secondary H-tree distribution device including at least one secondary Y-branch having a second radius of curvature different than the first radius of curvature, wherein the primary H-tree distribution device includes at least one other primary Y-branch having a third radius of curvature different than the first radius of curvature and wherein the at least one secondary H-tree distribution device includes at least one other secondary Y-branch having a fourth radius of curvature different than the second radius of curvature.

2. The optical network of claim 1, wherein the second radius of curvature is less than the first radius of curvature.

3. An optical network comprising:
   a substrate;
   a primary H-tree distribution device disposed in the substrate and adapted to receive an optical signal, the primary H-tree distribution device including at least one primary Y-branch having a first radius of curvature; and
   at least one secondary H-tree distribution device disposed in the substrate and coupled to the primary H-tree distribution device, the at least one secondary H-tree distribution device including at least one secondary Y-branch having a second radius of curvature different than the first radius of curvature wherein the primary H-tree distribution device includes three primary Y-branches each having the first radius of curvature and wherein the at least one secondary H-tree distribution device has three secondary Y-branches each having the second radius of curvature.

4. The optical network of claim 1, further comprising an optical-to-electrical converter coupled to the at least one of the secondary H-tree distribution devices.

5. The optical network of claim 4, wherein the optical-to-electrical converter is evanescently coupled to the at least one other secondary H-tree distribution device.

6. The optical network of claim 4, wherein the optical-to-electrical converter is butt coupled to the at least one other secondary H-tree distribution device.

7. The optical network of claim 1, wherein the at least one secondary H-tree distribution device comprises four secondary H-tree distribution devices symmetrically coupled to the primary H-tree distribution device.

8. The optical network of claim 7, further comprising an array of optical-to-electrical converters coupled to the four secondary H-tree distribution devices.

9. The optical network of claim 1, wherein the substrate comprises a silicon or polysilicon material.

10. The optical network of claim 9, wherein the substrate comprises $SiO_2$.

11. The optical network of claim 1, wherein the primary H-tree distribution device and the at least one secondary H-tree distribution device comprise a material selected from the group consisting of $SiO_xN_y$, where x is from 0 to 2 and y is from 0 to 1.33.

12. The optical network of claim 1, wherein the first radius of curvature and the second radius of curvature are between 800 $\mu$m and 20 $\mu$m.

13. An optical network comprising:
   a substrate; and
   an H-tree device comprising N consecutive Y-branches in the substrate and with an increasingly smaller radius of curvature for each consecutive Y-branch, where N is an integer greater than 2.

14. The optical network of claim 13, wherein the substrate comprises a silicon or polysilicon material.

15. The optical network of claim 13, wherein the substrate has a cladding region comprising $SiO_2$.

16. The optical network of claim 13, wherein the H-Tree device comprises a material selected from the group consisting of $SiO_xN_y$, where x is from 0 to 2 and y is from 0 to 1.33.

17. The optical network of claim 13 further comprising at least one optical-to-electrical converter coupled to at least one of the N consecutive Y-branches and adapted to produce an electrical signal in response to an optical signal propagating within the at least one of the N consecutive Y-branches.

18. The optical network of claim 17, wherein the at least one optical-to-electrical converter is butt coupled to the at least one of the N consecutive Y-branches.

19. The optical network of claim 17, wherein the at least one optical-to-electrical converter is evanescently coupled to the at least one of the N consecutive Y-branches.

20. A method of forming an optical device to propagate an input signal, the method comprising:
   forming an input waveguide in a substrate; and
   forming N consecutive Y-branches with an increasingly smaller radius of curvature for each consecutive Y-branch, where N is an integer greater than 2; and
   coupling a first of the N consecutive Y-branches to the input waveguide.

21. The method of claim 20, further comprising evanescently coupling an optical-to-electrical converter to at least one of the N consecutive Y-branches.

22. The method of claim 20, further comprising directly coupling an optical-to-electrical converter to the at least one of the N consecutive Y-branches.

23. The method of claim 20, wherein the substrate comprises $SiO_2$.

24. The method of claim 20, further comprising forming the N consecutive Y-branches comprising a material selected from the group consisting of $SiO_xN_y$, where x is from 0 to 2 and y is from 0 to 1.33.

25. The method of claim 20, further comprising forming the N consecutive Y-branches as an H-tree device.

26. An optical H-tree distribution device formed within a substrate, the H-tree distribution device comprising:
- a first Y-branch having a first radius of curvature, wherein the first Y-branch is an input Y-branch;
- a second Y-branch having a second radius of curvature and coupled to a first output of the first Y-branch; and
- a third Y-branch having a third radius of curvature and coupled to a second output of the first Y-branch, wherein at least two of the first radius of curvature, the second radius of curvature, and the third radius of curvature are dissimilar.

27. The optical H-tree distribution device of claim 26, wherein the first radius of curvature is larger than the second radius of curvature, which is larger than the third radius of curvature.

28. The optical H-tree distribution device of claim 26, wherein the first radius of curvature is larger than the second radius of curvature, which is substantially identical to the third radius of curvature.

29. A method of forming an optical device comprising:
- forming a first Y-branch in a substrate, the first Y-branch having a first radius of curvature;
- forming a second Y-branch in the substrate and coupled to a first output of the first Y-branch, the second Y-branch having a second radius of curvature; and
- forming a third Y-branch in the substrate and coupled to a second output of the first Y-branch, the third Y-branch having a third radius of curvature, where the first radius of curvature is dissimilar to at least one of the second radius of curvature and the third radius of curvature, and wherein the first Y-branch, the second Y-branch, and the third Y-branch form an H-tree distribution device.

30. The method of claim 29, wherein the substrate comprises $SiO_2$.

31. The method of claim 29, wherein the first Y-branch, the second Y-branch and the third Y-branch comprise a material selected from the group consisting of $SiO_xN_y$, where x is from 0 to 2 and y is from 0 to 1.33.

32. The optical network of claim 1, wherein at least one of the first radius of curvature and the second radius of curvature is below 20 $\mu$m.

33. A $1\times2^N$ optical splitter formed within a substrate, the optical splitter comprising N Y-branch stages, wherein each of the N Y-branch stages is coupled to at least one other of the N Y-branch stages, wherein each of the N Y-branch stages has a different radius of curvature and wherein N is an odd integer greater than 1.

34. The optical splitter of claim 33, wherein each Y-branch stage comprises at least one pair of Y-branches coupled to a primary Y-branch, the Y-branch pair having the same radius of curvature.

* * * * *